(12) United States Patent
Weston (10) Patent No.: US 7,647,942 B2
(45) Date of Patent: Jan. 19, 2010

(54) CONSTANT FLOW RATE VALVE (75) Inventor: Richard R. Weston, Nazareth, PA (US)

(73) Assignee: Victaulic Company, Easton, PA (US)

( * ) Notice: Subject to any disclaimer, the term of this patent is extended or adjusted under 35 U.S.C. 154(b) by 406 days.

(21) Appl. No.: 11/677,079

(22) Filed: Feb. 21, 2007

(65) Prior Publication Data
US 2008/0196774 A1    Aug. 21, 2008

(51) Int. Cl.
*G05D 7/01*     (2006.01)
(52) U.S. Cl. .................... 137/503; 137/454.6
(58) Field of Classification Search ......... 137/454.6, 137/98, 100, 597, 501, 503
See application file for complete search history.

(56) References Cited

U.S. PATENT DOCUMENTS

| | | | | |
|---|---|---|---|---|
| 2,816,569 | A | 12/1957 | Heyer et al | 137/454.6 |
| 3,076,471 | A | 2/1963 | Salerno | 137/219 |
| 3,374,803 | A * | 3/1968 | Leveque | 137/503 |
| 3,648,718 | A | 3/1972 | Curran | 137/269 |
| 3,724,494 | A | 4/1973 | Alber | 137/501 |
| 3,873,063 | A | 3/1975 | Illing | 251/282 |
| 3,881,508 | A | 5/1975 | Smith | 137/501 |
| 4,147,177 | A | 4/1979 | Iwatsuki | 137/501 |
| 4,276,906 | A | 7/1981 | Eguchi | 137/625.38 |
| 4,305,423 | A | 12/1981 | Adler | 137/505.13 |
| 4,341,370 | A | 7/1982 | Banks | 251/282 |
| 4,449,548 | A | 5/1984 | Tutherly | 137/468 |
| 4,760,866 | A | 8/1988 | Adler | 137/614.17 |
| 4,922,956 | A | 5/1990 | Taube, Sr. et al. | 137/504 |
| 4,979,530 | A * | 12/1990 | Breda | 137/100 |
| 5,000,219 | A | 3/1991 | Taube, Sr. et al. | 137/501 |
| 5,097,863 | A | 3/1992 | McCann et al. | 137/504 |
| 5,157,947 | A | 10/1992 | Weirich et al. | 91/461 |
| 5,181,534 | A | 1/1993 | Hashida et al. | 137/501 |
| 5,213,303 | A | 5/1993 | Walker | |
| 5,280,805 | A | 1/1994 | Skoglund | 137/504 |
| 5,487,405 | A | 1/1996 | Skoglund | 137/501 |

(Continued)

FOREIGN PATENT DOCUMENTS

WO    WO 2006/100973 A1    9/2006

OTHER PUBLICATIONS

International Search Report dated Jun. 26, 2008 (3 pages).

(Continued)

*Primary Examiner*—Stephen Hepperle
(74) *Attorney, Agent, or Firm*—Ballard Spahr LLP (57) ABSTRACT

A constant flow rate valve has a housing in which a rotatable sleeve is positioned between the valve's inlet and outlet. Apertures in the sleeve move into alignment with the valve's inlet and outlet upon sleeve rotation to establish the fluid flow rate. A piston is movable longitudinally within the sleeve bore. The piston has openings which align with the apertures in the sleeve upon longitudinal motion of the piston. Pressure ducts connect each end of the sleeve to the inlet and outlet. The piston moves in response to relative pressure changes in the inlet and outlet communicated by the pressure ducts. The area of overlap between the piston's openings and the sleeve's apertures varies with piston motion to ensure a constant flow rate in spite of relative inlet and outlet pressure changes. The ends of the sleeve are in fluid communication to control the response sensitivity of the piston.

22 Claims, 5 Drawing Sheets

U.S. PATENT DOCUMENTS

| | | | | |
|---|---|---|---|---|
| 5,524,670 | A * | 6/1996 | Castle | 137/504 |
| 5,622,204 | A | 4/1997 | Skoglund | 137/501 |
| 5,685,332 | A | 11/1997 | Overdiek et al. | 137/503 |
| 5,878,766 | A | 3/1999 | Dekhtyar | 137/8 |
| 5,904,177 | A | 5/1999 | Mullin et al. | 137/503 |
| 5,971,012 | A | 10/1999 | Skoglund | 137/501 |
| 6,123,094 | A * | 9/2000 | Breda | 137/98 |
| 6,196,259 | B1 * | 3/2001 | Weber | 137/504 |
| 6,216,721 | B1 | 4/2001 | Perez | 137/219 |
| 6,325,150 | B1 | 12/2001 | Rayssiguier | 166/334.1 |
| 6,725,880 | B1 | 4/2004 | Liu | 137/501 |
| 6,817,416 | B2 | 11/2004 | Wilson et al. | 166/332.1 |
| 2005/0211305 | A1 | 9/2005 | Kirchner et al. | |

OTHER PUBLICATIONS

Written Opinion of the International Searching Authority dated Jun. 26, 2008 (6 pages).

* cited by examiner

CONSTANT FLOW RATE VALVE

FIELD OF THE INVENTION

This invention relates to valves which maintain a substantially constant flow rate in spite of changes in pressure at the valve inlet and/or outlet.

BACKGROUND OF THE INVENTION

Valves which maintain a substantially constant flow rate despite pressure fluctuations at their inlets and/or outlets find widespread use among a spectrum of applications. One notable example is the use of such valves in hydronic system applications wherein water is used as a heat transfer means for heating, cooling and heat transfer. Such systems may have multiple hydronic units, such as heaters, heat exchangers and/or chillers arranged in parallel to receive water from a common feed line. Valves are arranged in series with each unit to control the flow of water to the unit in response to the varying demand of the industrial processes, and heating or cooling functions supported by the system. As a result of the control valves opening and closing to control the flow of water, the feed line may experience significant pressure fluctuations which may lead to undesired variations in the flow rate of water to the various units in the system.

Constant flow rate valves are used to mitigate this problem and help maintain a substantially constant flow rate under fluctuating inlet and/or outlet pressures. However, due to uncertainties inherent in the design of hydronic systems as well as the wide performance variation which may be required of some systems, it is often difficult to specify valves having the necessary characteristics during the system design stage. These uncertainties result in a trial and error approach wherein the adequacy of a valve is often ascertainable only after installation and testing have occurred. Valves must often be replaced because they are not suited to the particular demands of the hydronic system in which they are installed, resulting in increased expense. Furthermore, it is advantageous to have the ability to assert some control over the response sensitivity of constant flow valves to afford a more stable and effective hydronic system.

There is a need for constant flow rate valves which are adjustable in situ to tailor the valve characteristics to the demands of a particular system and avoid the need to swap out valves because of design uncertainties. It is further advantageous to be able to adjust the sensitivity of response of such valves so as to better integrate them into a particular hydronic system.

SUMMARY OF THE INVENTION

The invention concerns a valve for maintaining a substantially constant fluid flow rate in response to varying pressure across the valve. The valve comprises a housing having an inlet duct and an outlet duct. A sleeve is rotatably positioned within the housing. An inlet aperture and an outlet aperture extend through the sleeve. Rotation of the sleeve aligns at least a portion of the inlet and outlet apertures with the inlet and outlet ducts respectively. The fluid flow rate is proportional to a first area of overlap of at least one of the inlet and outlet apertures with one of the inlet and outlet ducts.

A piston is slidably positioned within the sleeve. An inlet opening and an outlet opening extend through the piston. Sliding motion of the piston aligns at least a portion of the piston's inlet and outlet openings with the sleeve's inlet and outlet apertures respectively. The flow rate is further proportional to a second area of overlap of at least one of the inlet and outlet openings of the piston with one of the inlet and outlet apertures of the sleeve. The piston is movable in response to the pressure to vary the second area of overlap and thereby maintain the fluid flow rate substantially constant.

The valve may have a first pressure duct providing fluid communication between the inlet duct and a first end of the piston, and a second pressure duct providing fluid communication between the outlet duct and a second end of the piston opposite the first end. The piston moves within the sleeve in response to pressure changes within the inlet duct and the outlet duct, thereby changing the second area of overlap between the inlet and outlet openings of the piston and the inlet and outlet apertures of the sleeve to maintain the substantially constant fluid flow rate.

In one embodiment, the inlet aperture in the sleeve has an elongated shape extending in a circumferential direction around the sleeve. The inlet aperture may also have first and second ends, the inlet aperture being wider at the first end than at the second end. Similar to the inlet aperture, the outlet aperture may also have an elongated shape extending in a circumferential direction around the sleeve. The outlet aperture may also have first and second ends wherein the outlet aperture is wider at the first end than at the second end.

Furthermore, the inlet opening in the piston may have a T shape wherein the leg of the T is substantially aligned with the direction of motion of the piston within the sleeve. Similarly, the outlet opening in the piston may also have a T shape, the leg of the T shape being substantially aligned with the direction of motion of the piston within the sleeve.

Preferably, a biasing member is positioned within the sleeve for biasing the piston toward the first pressure duct.

In another embodiment, the valve has a conduit providing fluid communication between the first and second ends of the piston. The conduit controls sensitivity of response of the piston to pressure changes between the inlet and outlet ducts. To further augment sensitivity control, a trim valve may be positioned within the conduit. The trim valve is adjustable to control the flow of fluid through the conduit and thereby adjust the sensitivity of response of the piston.

DETAILED DESCRIPTION OF THE EMBODIMENTS

Figure 1:
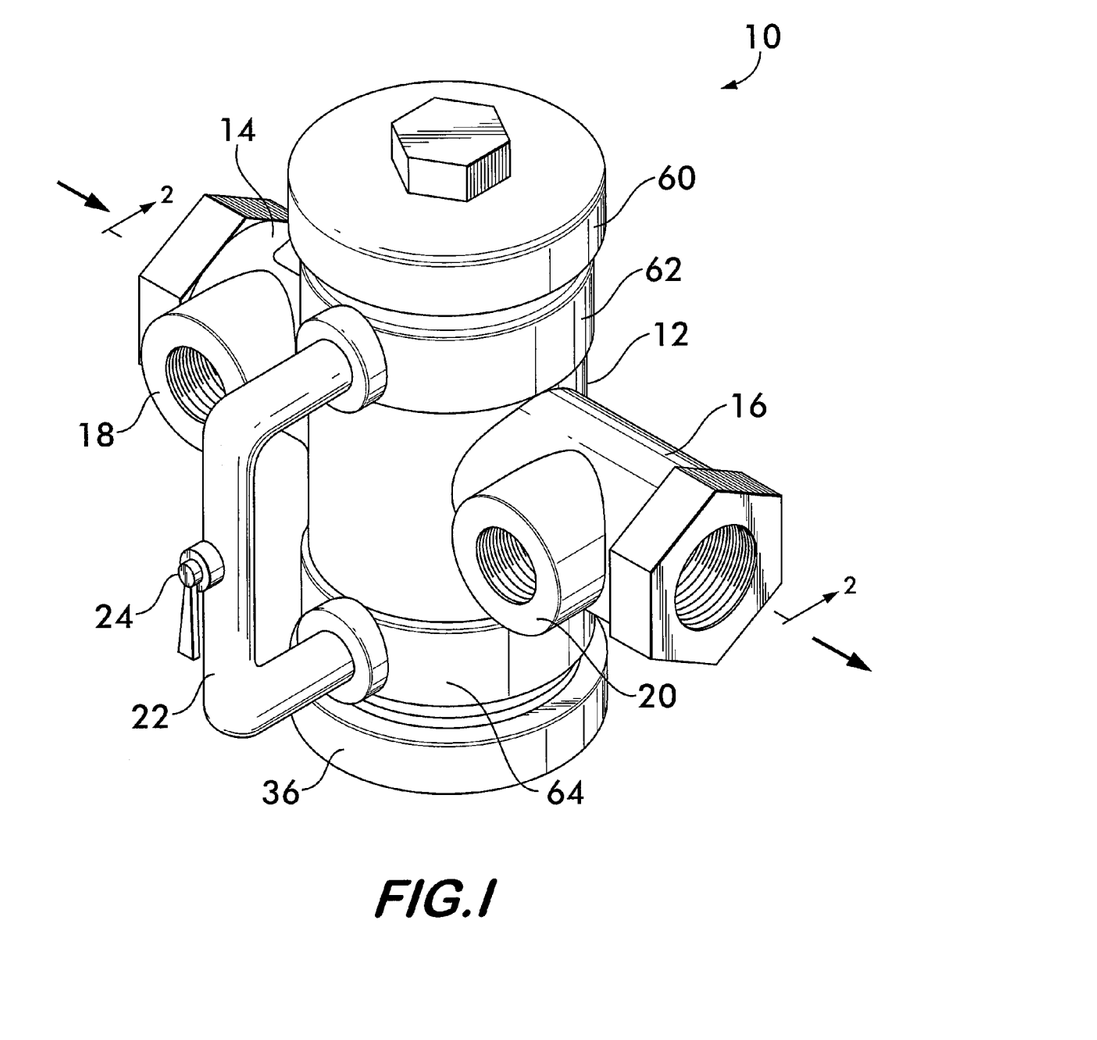
FIG. 1 is a perspective view of a constant flow rate valve according to the invention.

FIG. 1 shows a constant flow rate valve 10 according to the invention. Valve 10 has a housing 12 with an inlet duct 14 and an outlet duct 16. Each duct may have respective nipples 18 and 20 which provide pressure taps capable of receiving pressure gauges or transducers convenient for pressure measurements at the inlet and outlet. Although the ducts and nipples are shown with threaded connections, this is by way of example only, and other connections, such as brazed, soldered, or welded connections as well as compression connections and mechanical couplings, are also feasible. A bypass conduit 22 provides fluid communication between parts of the valve subject to inlet duct and outlet duct pressures to allow for control of valve response sensitivity as described below. A trim valve 24 may be located in the bypass conduit to provide sensitivity adjustment capability.

Figure 2:
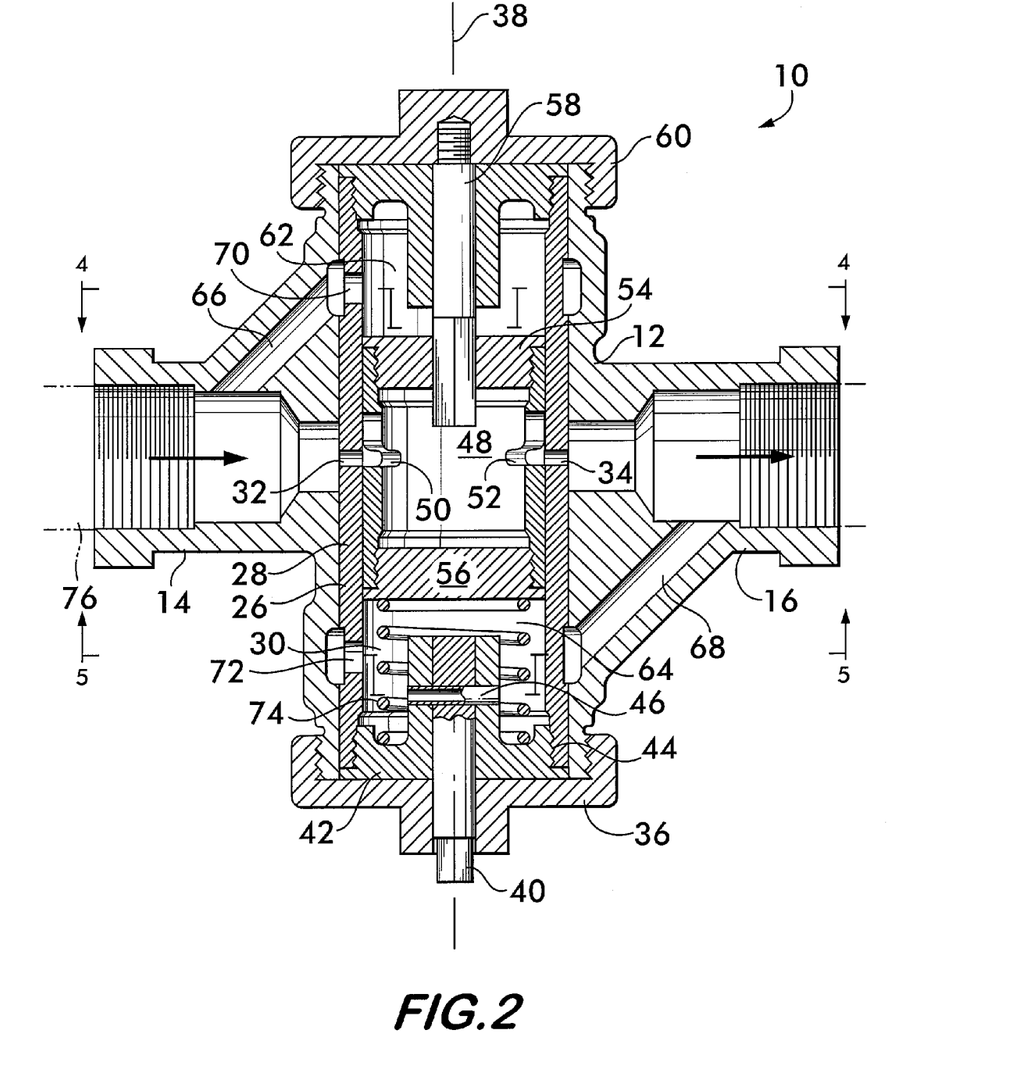
FIGS. 2 and 3 are sectional views taken at line 2-2 of FIG. 1 showing the valve in operation.

FIG. 2 shows a sectional view of the valve 10 illustrating its internal components. A sleeve 26 is positioned within housing 12 between the inlet duct 14 and the outlet duct 16. Sleeve 26, shown in detail in FIG. 6, comprises a sidewall 28 surrounding and defining a bore 30. An inlet aperture 32 and an outlet aperture 34 extend through the sidewall 28. The inlet and outlet apertures are positioned so as to align with the inlet and outlet ducts respectively (as shown in FIG. 2) to permit flow of fluid from the inlet to the outlet. In the example embodiment described herein, the inlet and outlet apertures are substantially diametrically opposite one another, consistent with the opposing positions of the inlet and outlet ducts. However, other positional arrangements of the apertures are also feasible to accommodate other positions of inlet and outlet ducts, for example, if the ducts are at right angles to one another.

With reference again to FIG. 6, the inlet and outlet apertures 32 and 34 each have an elongated shape that extends circumferentially around the sleeve 26. The apertures also are wider at one end (32a, 34a) than at their opposite ends (32b, 34b). This allows for adjustability of fluid flow rate as described below. Note that other aperture shapes, such as round or polygonal, are also feasible. Furthermore, the size of the apertures 32 and 34 could also be different from one another, with the smaller aperture, be it either the inlet or the outlet aperture, controlling the flow rate through the valve.

As best shown in FIG. 2, sleeve 26 is captured within the housing 12 by a cap 36 preferably threaded onto the housing. The sleeve is rotatable within the housing about its longitudinal axis 38. Rotation of the sleeve is effected by a stem 40 that extends through the cap 36 and is coupled to a plug 42 attached to the sleeve, in this example by a threaded connection 44. Stem 40 is coupled to the plug 42 by a pin 46 (see also FIG. 5) which prevents relative rotation between the stem and the plug. Thus, when the stem 40 is rotated, sleeve 26 rotates with it relative to housing 12.

Rotation of the sleeve 26 permits a greater or lesser portion of the inlet and outlet apertures 32 and 34 to be aligned with the inlet and outlet ducts 14 and 16, thereby varying the cross sectional area of overlap of the apertures with the ducts. This provides an adjustable control for setting a desired rate of fluid flow through the valve 10. The shape of either one or both of the inlet and outlet apertures may be established to create a particular functional relationship between the rotational position of the sleeve and the flow rate through the valve for a specified inlet and outlet pressure. For example, the inlet shape could be established such that the flow rate increases linearly, parabolically or exponentially, with rotation of the sleeve. Other functional relationships are also feasible.

Figure 6:
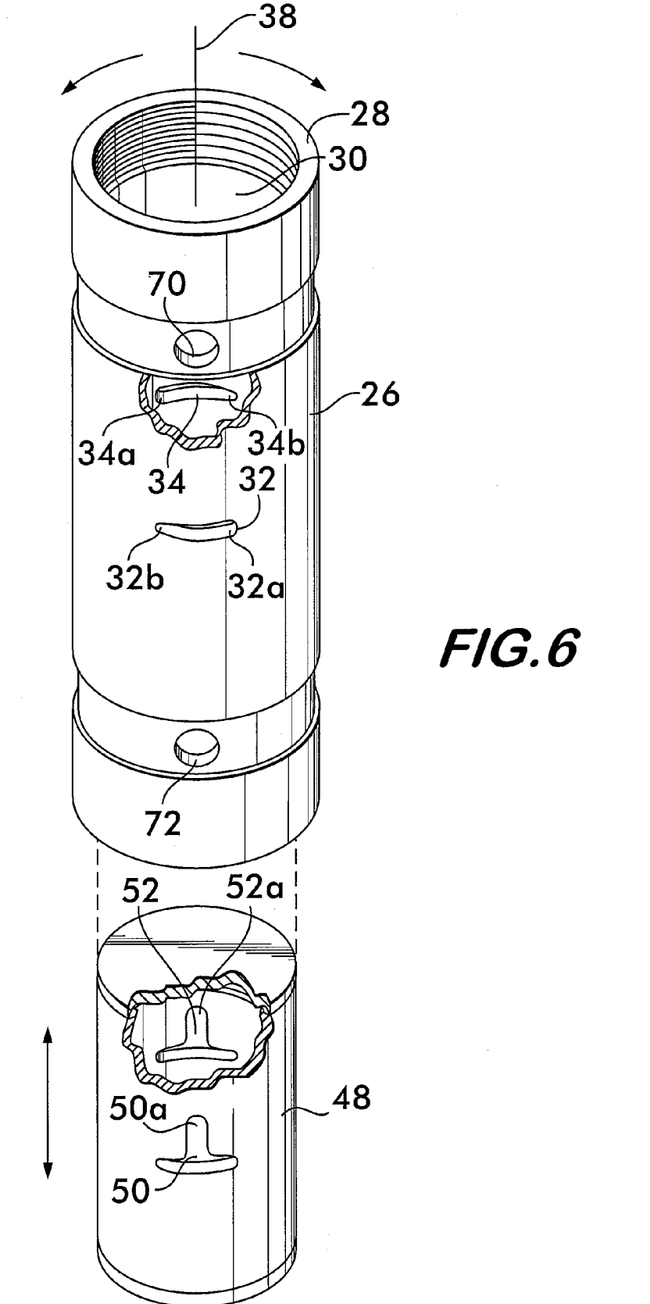
FIG. 6 is a detailed perspective view showing the motion of components within the valve according to the invention.

As shown in FIGS. 2 and 6, a piston 48 is positioned within the bore 30 of the sleeve 26 and is slidably movable along the longitudinal axis 38 of the sleeve. Piston 48, in this example, is hollow and has an inlet opening 50 and an outlet opening 52 that extend through the piston. The openings are in fluid communication with one another.

The inlet and outlet openings 50 and 52 each have a T shape. The legs 50a, 52a of each T are substantially aligned with the longitudinal axis 38 of the sleeve 26, corresponding to the direction of motion of the piston within the sleeve. The shape and alignment of the openings allows for further adjustability of fluid flow rate through the valve as described below. Note that other opening shapes are also feasible. Furthermore, the size of the openings 50 and 52 could also be different from one another, with the smaller opening, be it either the inlet or the outlet opening, providing further control of the flow rate through the valve.

Piston 48 includes piston heads 54 and 56 arranged at opposite ends of the piston. The piston heads allow the piston to respond to pressure within the sleeve as described below. The sliding motion of the piston within the sleeve is guided by a pin 58 secured to an end cap 60 attached to the housing 12. Pin 58, by virtue of its non-round cross sectional shape (see FIG. 4), also maintains the orientation of the piston, preventing its rotation within the sleeve so that the piston's inlet and outlet openings 50 and 52 always align with the inlet and outlet ducts 14 and 16.

Figure 4:
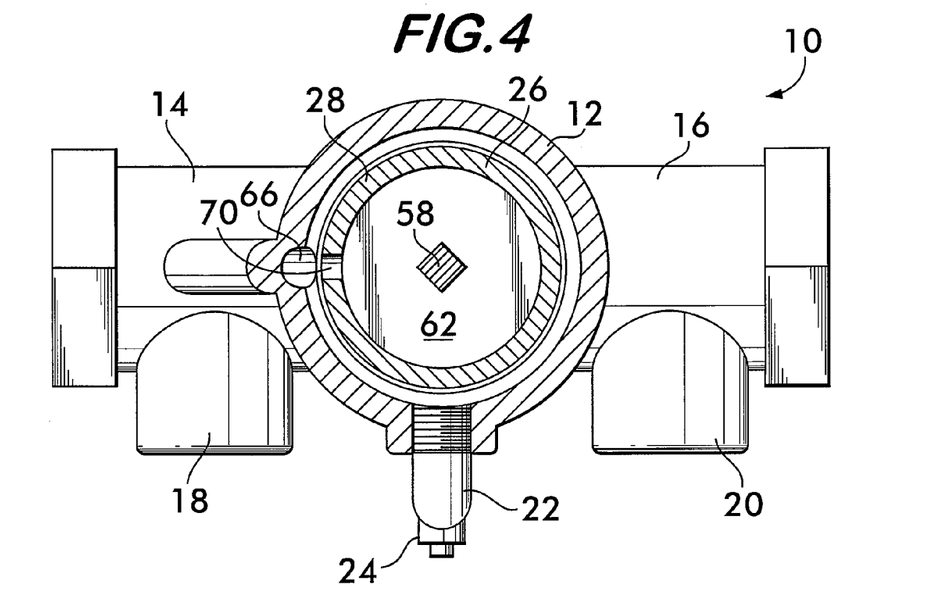
FIG. 4 is a cross-sectional view taken at line 4-4 of FIG. 2.
Figure 5:
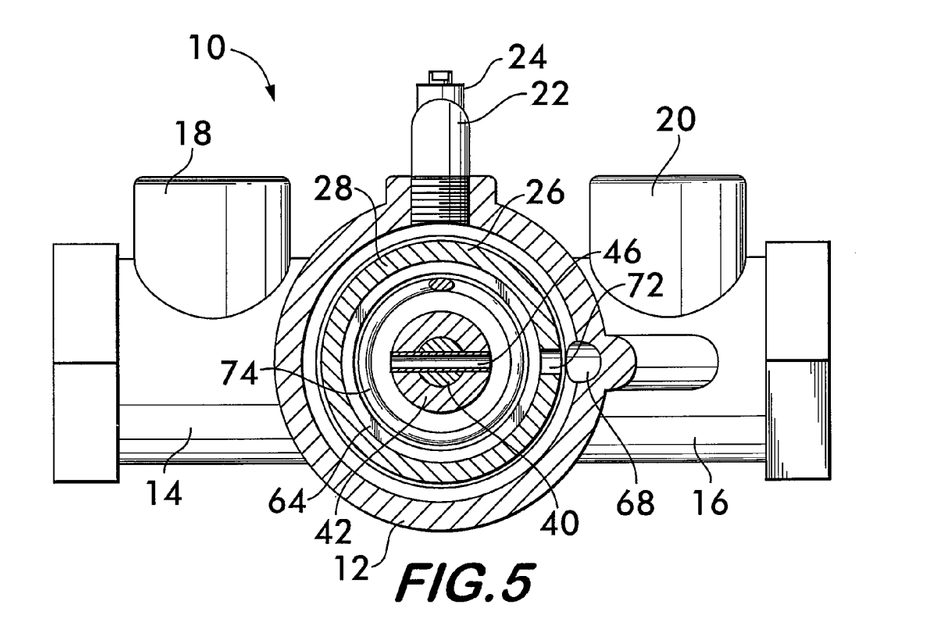
FIG. 5 is a cross-sectional view taken at line 5-5 of FIG. 2.

As shown in FIG. 2, piston 48 effectively divides the sleeve bore 30 into two chambers, an inlet chamber 62 and an outlet chamber 64. Inlet chamber 62 is in fluid communication with the inlet duct 14 through a pressure duct 66. Similarly, the outlet chamber 64 is in fluid communication with the outlet duct 16 through a pressure duct 68. The pressure ducts are also illustrated in FIGS. 4 and 5. As shown in FIG. 6, the sleeve 26 has inlet and outlet pressure openings 70 and 72 respectively in its sidewall 28 which cooperate with the pressure ducts to connect the inlet chamber 62 with the inlet duct 14 and the outlet chamber 64 with the outlet duct 16.

Piston 48 responds to pressure differentials between the inlet and outlet ducts. An increase in pressure in the inlet duct 14 causes an increase in pressure in the inlet chamber 62, thereby forcing the piston into the outlet chamber 64. Likewise, an increase in pressure in the outlet duct 16 results in an increase in pressure within the outlet chamber 64, thereby forcing the piston further into the inlet chamber 62. A biasing member, for example, a compression spring 74 is positioned in one of the chambers (in this example the outlet chamber 64) to bias the piston into a preferred nominal position within the sleeve.

Sliding motion of the piston 48 relatively to the sleeve 26 permits a greater or lesser portion of the inlet and outlet openings 50 and 52 in the piston to align with the inlet and outlet apertures 32 and 34 (respectively) within the sleeve, thereby varying the cross sectional area of overlap of the piston openings with the sleeve apertures. This allows for adjustment of the fluid flow through the valve 10 in response to pressure changes between the inlet and outlet ducts 14 and 16. The shape of either one or both of the inlet and outlet openings 50 and 52 in the piston 48 is designed to permit greater or lesser fluid flow through the valve as the piston moves in response to the relative pressure changes in the inlet and outlet ducts 14 and 16 as described below.

Figure 3:
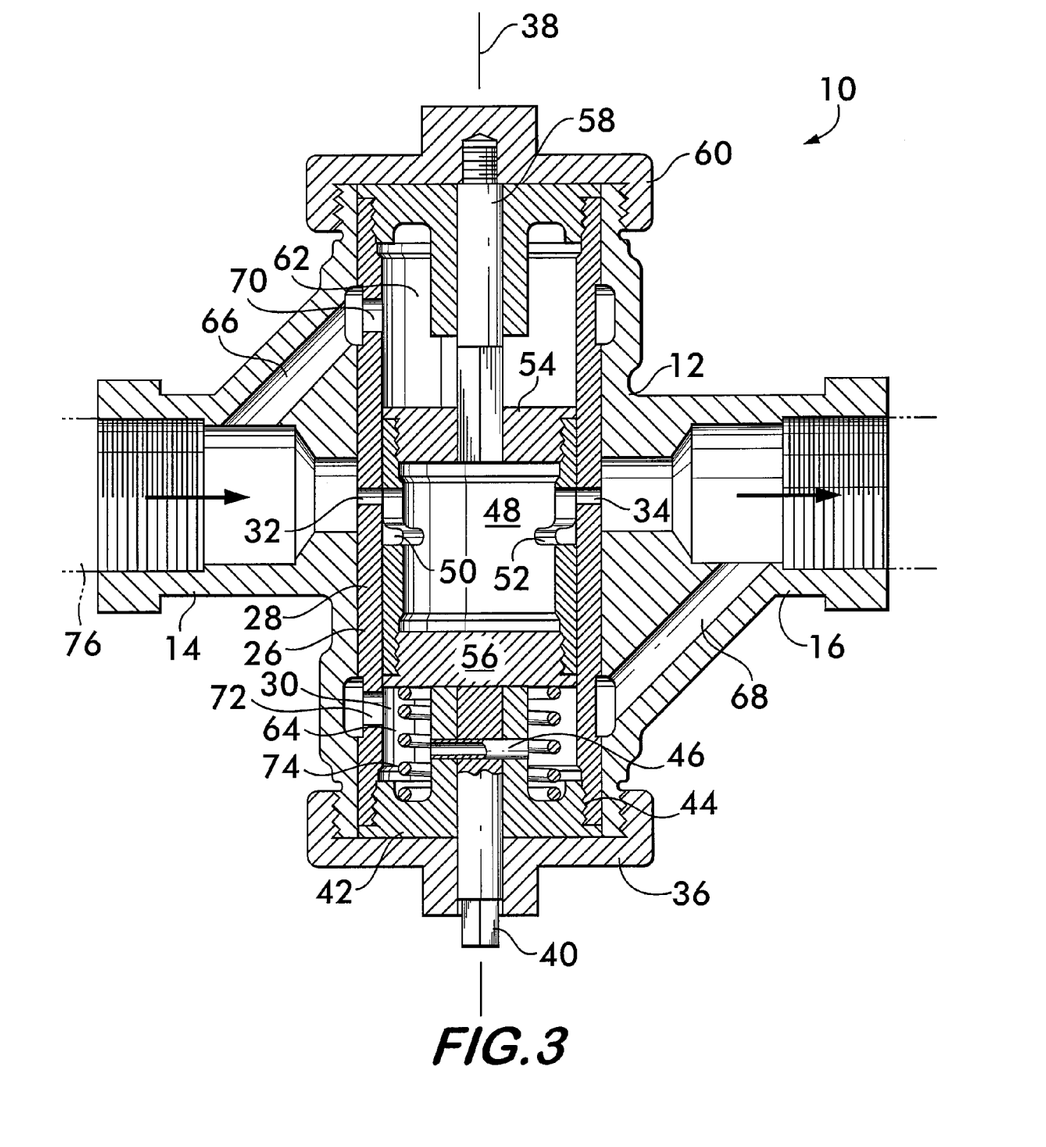

Operation of the valve 10 is described below with reference to FIGS. 2 and 3. As shown in FIG. 2, valve 10 is integrated into a piping network 76 represented in phantom line. The inlet and outlet ducts are subject to the nominal operating pressures of the system and the piston 48 is biased to a position within sleeve 26 by spring 74 so that the maximum area of the inlet and outlet openings 50 and 52 in the piston overlap the inlet and outlet apertures 32 and 34 in the sleeve. In this example valve, the cap of the T shape of the openings is positioned to align with the apertures. The area of the openings 50 and 52 overlapping the apertures 32 and 34 is large enough so that the sleeve apertures 32 and 34 control the fluid flow rate, and not the piston openings 50 and 52. This alignment between the piston and sleeve permits the sleeve apertures to be used to establish the desired baseline flow rate through the valve. Using stem 40, the sleeve 26 is rotated about axis 38 to bring a portion of the inlet and outlet apertures 32 and 34 into alignment with the inlet and outlet ducts 14 and 16. The area of overlap of the apertures with the ducts is increased or decreased by rotating the sleeve as required to achieve the desired flow rate through the valve. The necessary degree of sleeve rotation will be a function of the shape and size of the apertures. Empirically derived knowledge of the valve flow characteristics coupled with pressure measurements at the inlet and outlet ducts using pressure taps provided by nipples 18 and 20 will permit one to ascertain when the desired flow rate has been achieved.

Flow through the valve will remain substantially constant over a limited pressure range by the action of piston 48. As illustrated in FIG. 3, an increase in pressure in inlet duct 14 relative to the outlet duct 16 is communicated to the inlet chamber 62 through the pressure duct 66 and pressure opening 70 in sleeve 26. The pressure increase in the inlet chamber 62 forces the piston to move into the outlet chamber 64, compressing the biasing spring 74. Fluid in the outlet chamber is forced into the outlet duct 16 through pressure opening 72 and pressure duct 68. An increase in inlet duct pressure would normally cause an increase in fluid flow rate through the valve, but the motion of the piston 48 in response to the pressure differential aligns a different part of the inlet and outlet openings 50 and 52 in the piston with the inlet and outlet apertures 32 and 34 in the sleeve. In this example valve, motion of the piston in a direction toward the outlet duct causes the legs 50a and 52a of the T shaped openings to align with the apertures. This reduces the area of overlap, thereby reducing the flow rate through the valve. The shapes of the inlet and outlet openings in the piston are such that the reduction in area is proportional to the increase in pressure so as to maintain the desired constant flow rate in spite of the change in inlet pressure. If the outlet pressure increases relative to the inlet pressure, the piston 48 moves toward the inlet chamber 67, thereby increasing the area of overlap between the inlet and outlet apertures in the sleeve and the inlet and outlet openings in the piston to allow greater flow and avoid the decrease in flow rate which would otherwise occur for such a pressure change.

The bypass conduit 22, shown in FIG. 1, provides fluid communication between the inlet and outlet chambers 62 and 64. By connecting these two chambers the sensitivity of the valve to pressure changes in the inlet and outlet can be controlled. The bypass conduit provides a damping effect on the motion of the piston 48. The degree of damping can be controlled by limiting the flow through the conduit. This can be accomplished by specifying the diameter of the conduit, by using an orifice, or by using a trim valve 24 to throttle the conduit and thereby provide the ability to vary the damping to suit the needs of a particular system.

Constant flow rate valves according to the invention provide improved adaptability to systems with uncertain or changing requirements by virtue of the adjustability of the baseline flow rate through the rotating sleeve. The ability to control the sensitivity of valve response to pressure changes by connecting the inlet and outlet chambers also lends significant versatility. The use of such valves should mitigate the need to replace valves which are not adequate for the requirements of the system, as the valve according to the invention may be adjusted to suit the actual conditions of the system.

What is claimed is:

1. A valve for maintaining a substantially constant fluid flow rate in response to varying pressure across said valve, said valve comprising:
    a housing having an inlet duct and an outlet duct;
    a sleeve rotatably positioned within said housing;
    an inlet aperture and an outlet aperture extending through said sleeve, rotation of said sleeve aligning at least a portion of said inlet and outlet apertures with said inlet and outlet ducts respectively, said fluid flow rate being proportional to a first area of overlap of at least one of said inlet and outlet apertures with one of said inlet and outlet ducts;
    a piston slidably positioned within said sleeve, said piston having first and second ends oppositely disposed;
    a conduit providing fluid communication between said first and second ends of said piston, said conduit controlling sensitivity of response of said piston to pressure changes between said inlet and outlet ducts; and
    an inlet opening and an outlet opening extending through said piston, sliding motion of said piston aligning at least a portion of said piston's inlet and outlet openings with said sleeve's inlet and outlet apertures respectively, said flow rate being further proportional to a second area of overlap of at least one of said inlet and outlet openings of said piston with one of said inlet and outlet apertures of said sleeve, said piston being movable in response to said pressure to vary said second area of overlap to maintain said fluid flow rate substantially constant.

2. A valve according to claim 1, wherein said inlet aperture has an elongated shape extending in a circumferential direction around said sleeve.

3. A valve according to claim 2, wherein said inlet aperture has first and second ends, said inlet aperture being wider at said first end than at said second end.

4. A valve according to claim 1, wherein said inlet opening in said piston has a T shape, the leg of said T shape being substantially aligned with the direction of motion of said piston within said sleeve.

5. A valve according to claim 1, wherein said outlet aperture has an elongated shape extending in a circumferential direction around said sleeve.

6. A valve according to claim 5, wherein said outlet aperture has first and second ends, said outlet aperture being wider at said first end than at said second end.

7. A valve according to claim 1, wherein said outlet opening in said piston has a T shape, the leg of said T shape being substantially aligned with the direction of motion of said piston within said sleeve.

8. A valve according to claim 1, further comprising a biasing member positioned within said sleeve for biasing said piston toward said first pressure duct.

9. A valve according to claim 1, further comprising a trim valve positioned within said conduit, said trim valve being adjustable to control the flow of fluid through said conduit and thereby adjust the sensitivity of response of said piston.

10. A valve adapted to maintain a constant fluid flow rate in response to varying fluid pressure across said valve, said valve comprising:
    a housing having an inlet duct and an outlet duct;
    a sleeve having a sidewall with an inlet aperture and an outlet aperture, said sleeve being positioned within said housing between said inlet and said outlet ducts, said sleeve being rotatable to position at least a portion of said inlet and said outlet apertures in overlapping relation with said inlet and outlet ducts respectively for establishing said fluid flow rate through said valve;
    a piston positioned within said sleeve, said piston having first and second ends oppositely disposed, said piston having an inlet opening and an outlet opening, said piston being movable to position at least a portion of said inlet and outlet openings into overlapping relation with said inlet and said outlet apertures respectively;
    a first pressure duct providing fluid communication between said inlet duct and a first end of said piston;

a second pressure duct providing fluid communication between said outlet duct and a second end of said piston opposite said first end; and wherein said piston moves within said sleeve in response to pressure changes within said inlet said outlet ducts thereby bringing said portions of said openings in said piston into overlapping relation with said apertures in said sleeve to maintain said constant fluid flow rate.

11. A valve according to claim 10, wherein said inlet aperture has an elongated shape extending in a circumferential direction around said sleeve.

12. A valve according to claim 11, wherein said inlet aperture has first and second ends, said inlet aperture being wider at said first end than at said second end.

13. A valve according to claim 10, wherein said inlet opening in said piston has a T shape, the leg of said T shape being substantially aligned with the direction of motion of said piston within said sleeve.

14. A valve according to claim 10, wherein said outlet aperture has an elongated shape extending in a circumferential direction around said sleeve.

15. A valve according to claim 14, wherein said outlet aperture has first and second ends, said outlet aperture being wider at said first end than at said second end.

16. A valve according to claim 10, wherein said outlet opening in said piston has a T shape, the leg of said T shape being substantially aligned with the direction of motion of said piston within said sleeve.

17. A valve according to claim 10, further comprising a biasing member positioned within said sleeve for biasing said piston toward said first pressure duct.

18. A valve according to claim 10, wherein both said inlet and outlet apertures have an elongated shape extending in a circumferential direction around said sleeve.

19. A valve according to claim 18, wherein said inlet and outlet apertures each have first and second ends, said apertures being wider at said first ends than at said second ends.

20. A valve according to claim 19, wherein both said inlet and outlet openings in said piston each have a T shape, the legs of said T shapes being substantially aligned with the direction of motion of said piston within said sleeve.

21. A valve according to claim 10, further comprising a conduit providing fluid communication between said first and second ends of said piston, said conduit controlling sensitivity of response of said piston to pressure changes between said inlet and outlet ducts.

22. A valve according to claim 21, further comprising a trim valve positioned within said conduit, said trim valve being adjustable to control the flow of fluid through said conduit and thereby adjust the sensitivity of response of said piston.

* * * * *